United States Patent
Lee et al.

(10) Patent No.: US 9,875,529 B2
(45) Date of Patent: Jan. 23, 2018

(54) DEVICE FOR REMOVING NOISE ON IMAGE USING CROSS-KERNEL TYPE MEDIAN FILTER AND METHOD THEREFOR

(71) Applicant: SILICONFILE TECHNOLOGIES INC., Gyeonggi-do (KR)

(72) Inventors: Bo Ra Lee, Gyeonggi-do (KR); Du Su Shin, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 54 days.

(21) Appl. No.: 15/056,472

(22) Filed: Feb. 29, 2016

(65) Prior Publication Data

US 2016/0253788 A1    Sep. 1, 2016

(30) Foreign Application Priority Data

Feb. 27, 2015  (KR) .................. 10-2015-0027958

(51) Int. Cl.
*G06T 5/20* (2006.01)
*G06T 5/00* (2006.01)

(52) U.S. Cl.
CPC .............. *G06T 5/002* (2013.01); *G06T 5/20* (2013.01); *G06T 2207/20032* (2013.01)

(58) Field of Classification Search
CPC .. G06T 5/002; G06T 5/20; G06T 2207/20032
See application file for complete search history.

(56) References Cited

U.S. PATENT DOCUMENTS

| | | | | |
|---|---|---|---|---|
| 4,975,864 A * | 12/1990 | Sendall | ............... | H04N 5/3656 341/139 |
| 5,446,501 A * | 8/1995 | Takemoto | ............... | H04N 5/21 348/615 |
| 6,721,458 B1 * | 4/2004 | Ancin | ............... | G06T 5/20 358/3.26 |
| 9,769,430 B1 * | 9/2017 | Bechtel | ............... | H04N 7/183 |
| 2002/0041331 A1 * | 4/2002 | Xiaomang | ............... | H04N 9/045 348/234 |
| 2002/0186890 A1 * | 12/2002 | Lee | ............... | H04N 19/80 382/239 |
| 2004/0080639 A1 * | 4/2004 | Ishiga | ............... | H04N 9/045 348/272 |
| 2007/0229675 A1 * | 10/2007 | Nishide | ............... | H04N 5/208 348/222.1 |

(Continued)

OTHER PUBLICATIONS

Vijaykumar et al. ("New decision-based trimmed median filter for high-density salt-and-pepper noise removal in images," Journal of Electronic Imaging, vol. 23(3), Jun. 2014).*

(Continued)

*Primary Examiner* — Yubin Hung
(74) *Attorney, Agent, or Firm* — IP & T Group LLP

(57) ABSTRACT

A device for removing a noise on an image using a cross-kernel type median filter includes a target pixel determination unit configured to determine whether a target pixel is a noise or not; a peripheral pixel determination unit configured to determine degrees of the noise on a peripheral pixel information of a peripheral pixel of the target pixel; and a noise removing unit configured to remove the noise of the target pixel and corrects the image by applying a cross-kernel type median filter based on the peripheral pixel information.

10 Claims, 15 Drawing Sheets

(56) References Cited

U.S. PATENT DOCUMENTS

2008/0095433 A1* 4/2008 Johnson .................. G06T 5/008
382/169
2014/0241636 A1* 8/2014 Singh ....................... G06K 9/40
382/199

OTHER PUBLICATIONS

Akkoul et al. ("A new detector for switching median filter," Proceedings of 6th International Symposium on Image and Signal Processing and Analysis, 2009).*

John C. Russ (The Image Processing Handbook, 3rd ed., CRC Press, 1999, pp. 179-180).*

* cited by examiner

DEVICE FOR REMOVING NOISE ON IMAGE USING CROSS-KERNEL TYPE MEDIAN FILTER AND METHOD THEREFOR

CROSS-REFERENCE TO RELATED APPLICATIONS

The present application claims priority of Korean Patent Application No. 10-2015-0027958, and filed on Feb. 27, 2015, which is incorporated herein by reference in its entirety.

BACKGROUND

1. Field

Exemplary embodiments of the present invention relate to a device for removing a noise on an image using a cross-kernel type median filter and a method therefor, and more particularly, a device for removing a noise on an image using a cross-kernel type median filter and a method therefor that improves an image quality and a compression efficiency and acquires an improved signal to noise ratio by solving a structural problem of a conventional median filter having a low image quality in an edge or a corner region of an image using a cross-kernel type median filter.

2. Description of the Related Art

In general, an image data is transferred and processed via a public television network or a cable network. Since a data transferring or processing step of an image data is exposed to various type noises, a noise is necessarily added to an original image, and the noise added to the image data deteriorates an image quality or resolution of a reproduced image.

Since a signal to noise ratio is lowered in a low illuminance, a noise may be increased relatively to an original image, an image may not be recognized, and a subjective and visual satisfaction may be deteriorated by restoring a color, which does not exist in a signal processing step.

Meanwhile, since the signal to noise ratio is increased in a high illuminance, a subjective satisfaction is increased but an absolute value of a noise caused by a shot noise is increased.

A photographed image is compressed by a standard compression technique such as a joint photographic experts group (JPEG) or H.264. If a noise exists in an image, a negative effect that deteriorates a compression efficiency to a same image quality occurs. Thus, a process for removing the noise on the image is necessary to improve a subjective image quality and a compression efficiency.

The noise on the image may be classified into a noise on a light and darkness signal and a noise on a chroma signal. An optic nerve of a person includes rods for recognizing the light and darkness and cones for recognizing colors. At least one hundred million rods are distributed on a peripheral region of retina and perform a function of a fast black-and-white film. Millions of cones are densely distributed on a central region of the retinal and recognize colors under a sufficient brightness.

The rods determines whether the objects are visible or invisible. The rods have been developed to recognize the objects under a dark place or an intensive light. However, the colors indicate not a physical amount but a psychological sense, and are resulted from the eyes of people to distinguish the recognized objects through the light and darkness. Thus, the people are sensitive to the change of the light and darkness but are insensitive to the change of the colors.

Since the noise on the chroma signal is deviated from the nature, which is sensed by the people, people feel sensitively unnatural and uncomfortable. However, the nerve cells have been evolved such that people feel sensitively the minute change of the light and darkness. Thus, since the noise on the light and darkness is natural relatively, people feel naturally the noise on the light and darkness even if the noise on the light and darkness is a noise.

However, it is very important to remove the noise on the light and darkness and the chroma. In an image compression technique such as the JPEC or the H.264/H.265, the noise on the light and darkness deteriorates the compression efficiency and increases the size of the compressed image. Since this low compression efficiency causes a noise such as a blocking artifact in a reproduced image, it is more important to remove the noise appropriately.

A median filter may remove a noise with a high resolution on a boundary region. Thus, the median filter has been widely used to remove a noise on an image.

It is necessary to maintain a high resolution on a main outline of an object and remove only the noise on the image. It is a basic theory of the noise removing to remove a fast change of the image by acquiring an average value or a median based on the data, which are neighbored spatially. Since it is more efficient for the noise removing to acquire the median instead of the average value, the median filter has been widely used, and a noise removing algorithm includes two steps generally.

In a first step, it is determined whether a current processing pixel is a noise or not. A normal standard is to calculate a signal complexity on a predetermined region on a basis of the current processing pixel. The variance is widely used as a calculation method of the signal complexity.

If a position of a horizontal direction is denoted as 'i', a position of a vertical direction is denoted as 'j', a signal value is denoted as x(i,j), a horizontal direction region of the noise removing is denoted as 'i−N to i+N', and a vertical direction region of the noise removing is denoted as 'j−N to j+N', the variance $\sigma^2$ will be described as below with reference to the equation 1.

$$E[X] = \frac{1}{(2N+1)^2} \sum_{m=-N}^{N} \sum_{m=-N}^{N} x(i+m, j+n) = \mu$$

$$E[X^2] = \frac{1}{(2N+1)^2} \sum_{m=-N}^{N} \sum_{m=-N}^{N} x(i+m, j+n)^2$$

$$\sigma^2 = E[(X-\mu)^2]$$
$$= E[X^2 - 2\mu X + \mu^2]$$
$$= E[X^2] - 2\mu E[X] + \mu^2$$
$$= E[X^2] - 2\mu \cdot \mu + \mu^2$$
$$= E[X^2] - \mu^2$$

If the variance is determined as above, it is determined whether a noise can be removed or not on a target region by comparing a reference value with a predetermined reference value. Since the variance has a large value when the outline is included in the target region, the main outline may be protected by determining the noise removing in a case of the variance having a small value. If the noise removing is determined, the average value or the median on a predetermined target region on a basis of the current processing pixel is determined as a value where the noise is removed.

The average value indicates not the noise removing but the size reduction on the image. However, since the median indicates that a remarkable value is removed by comparing the neighbor values from each other, the efficiency of the noise removing is prominent. For example, if a current data value is 100 and values of four neighboring data are zero, since the current data value is prominent due to the difference between the current data value and the four neighboring data values, the current data is regarded as the noise and is removed.

That is, in this case, if the average value is acquired, the current data value is reduced from 100 to 20, and a noise reduction effect occurs. But, in this case, if the median is acquired, the current data value is reduced from 100 to 0, and a noise removing effect occurs.

FIG. 1 illustrates a method for removing a noise in accordance with a conventional technique.

Referring to FIG. 1, a central pixel 100 of 3×3 region is a target pixel on which a noise will be removed. That is, the target pixel on which the noise will be removed is disposed on a center instead of a corner 3×3 region.

When 10 bit data is assumed, a black rectangle shown in FIG. 1 represents a pixel having data value of a low bit ranged from 0 to 500, and a white rectangle shown in FIG. 1 represents a pixel having data value of an upper bit ranged from 600 to 1023.

Herein, if the average value is used, the noise removing effect may be not performed since the data may be not included in any one of two regions. However, if the median is used, the noise removing may be performed with the outline since the data are included in any one of two regions without determining whether the data is a noise or not.

That is, in case that the target pixel on which the noise will be removed is disposed on the center instead of the corners of two regions, it is possible to remove the noise through the median filter using a conventional method.

FIGS. 2A and 2B illustrate problems of the method for removing noise on an image in accordance with a conventional technique.

Referring to FIG. 2A, although a target pixel 200 on which a noise will be removed are disposed between two regions, if the target pixel 200 is disposed on a corner of one of two regions, the result is shown as FIG. 2B due to a characteristic of a median filter, which is determined by a majority value. That is, if the target pixel 200 is disposed on a corner between two regions, a noise removing or a noise reduction does not occur and a relevant image is removed.

FIGS. 3A and 3B illustrate other problems of a method for removing a noise removing a noise on an image in accordance with a conventional technique.

Referring to FIGS. 3A and 3B, in case that target pixels 300 on which a noise will be removed are disposed to have a thin line type on a region, an error may occur when the median is used. That is, although the target pixels 300 are determined as a portion of the relevant image, the target pixels 300 are removed since the target pixels 300 are not included in the majority within the kernel used in the median calculation.

Since the median filter is a most useful tool for removing a noise, the median filter has been used as a basic tool in a noise removing algorithm. Also, the median filter may remove a noise efficiently if it is determined reasonably whether the data is a noise or not. Thus, most noise removing algorithms removes the noise by using two steps of determining whether the data is a noise or not and then, removing the noise.

However, as described above, since an image quality is deteriorated on a sharp edge or a corner in a median filter, only the median filter itself may be not used for removing the noise.

SUMMARY

Exemplary embodiments of the present invention are directed to a device for removing a noise on an image using a cross-kernel type median filter and a method therefor that solves a structural problem of a conventional median filter by removing a noise on an image efficiently using a cross-kernel type median filter.

In accordance with an exemplary embodiment of the present invention, a device for removing a noise on an image using a cross-kernel type median filter includes a target pixel determination unit configured to determine whether a target pixel is a noise or not; a peripheral pixel determination unit configured to determine degrees of the noise on a peripheral pixel information of a peripheral pixel of the target pixel; and a noise removing unit configured to remove the noise of the target pixel and corrects the image by applying a cross-kernel type median filter based on the peripheral pixel information.

The cross-kernel type median filter may select a median filter from pixels neighbored to the target pixel out of the target pixel, which is disposed on a center of 3×3 region of the image, and pixels disposed on two lines, which are across along '+' shape or 'X' shape on a basis of the target pixel.

The cross-kernel type median filter may select a median filter from pixels spaced from the target pixel by a same interval out of the target pixel, which is disposed on a center of 3×3 region of the image, and pixels disposed on two lines, which are across from each other with '+' shape or 'X' shape on a basis of the target pixel.

In accordance with another exemplary embodiment of the present invention, a method for removing a noise on an image using a cross-kernel type median filter includes the steps of: determining whether a target pixel is a noise or not; determining information on a peripheral pixel of the target pixel; applying the cross-kernel type median filter based on the determined information of the peripheral pixel; and correcting the image by removing the noise using the cross-kernel type median filter.

The target pixel may be disposed on a center of 3×3 region of the image.

The cross-type median filter may select a median from pixels, which are disposed on two lines when the two lines are across on a basis of the target pixel, which are disposed on a center of 3×3 region of the image.

The two lines may include '+' shape or 'X' shape.

A median of 3×3 region is denoted as a first median, and a median of a region using the cross-kernel type median filter is denoted as a second median, and wherein when an absolute value of a difference value between the first median and a data value of the target pixel is less than a reference value, the first median is outputted as the value of the data where the noise is removed, and otherwise, the second median is outputted as the value of data where the noise is removed.

A median of 3×3 region is denoted as a first median, and a median of a region using the cross-kernel type median filter is denoted as a second median, and wherein an absolute value of a difference value between a maximum value of 3×3 region and a minimum value of the 3×3 region is less than a reference value, the first median may be outputted as the value of the data where the noise is removed, and otherwise, the second median is outputted as the value of data where the noise is removed.

A median of 3×3 region is denoted as a first median, and a median of a region using the cross-kernel type median filter is denoted as a second median, wherein when an absolute value of a difference value between the first median and the data value of the target pixel is less than a reference value, the first median may be outputted as the value of the data where the noise is removed, and wherein when the absolute value of the difference value between the first median and the data value of the target pixel is larger than the reference value, and the absolute value of the difference value between the second median and the data value of the target pixel is less than the reference value, the second median may be outputted as the value of data where the noise is removed, and otherwise the data value of the target pixel may be outputted as the value of the data where the noise is removed.

A median of 3×3 region is denoted as a first median, and a median of a region using the cross-kernel type median filter is denoted as a second median, wherein when an absolute value of a difference value between a maximum value of the 3×3 region and a minimum value of the 3×3 region is less than a reference value, the first median may be outputted as the value of the data where the noise is removed, and wherein when the absolute value of the difference value between the maximum value of the 3×3 region and a minimum value of the 3×3 region is larger than the reference value, and the absolute value of the difference value between the data value of the target pixel and the second median is less than the reference value, the second median may be outputted as the value of the data where the noise is removed, and otherwise the data value of the target pixel may be outputted as the value of the data where the noise is removed.

The reference value may be a square root of the data value of the target pixel.

The reference value may be a value acquired by multiplying the square root of the data value of the target pixel by a standard constant.

The reference value may be a square root of an average value of the 3×3 region.

The reference value may be a value acquired by multiplying the square root of the average value of the 3×3 region by a standard constant.

DETAILED DESCRIPTION

Figure 1:
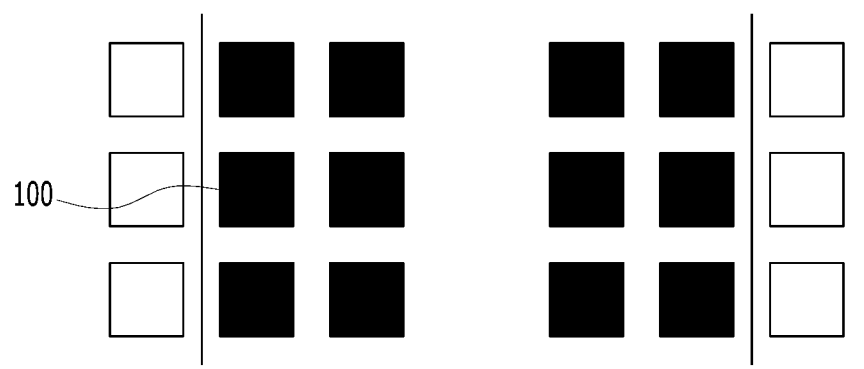
FIG. 1 illustrates a method for removing a noise on an image in accordance with a conventional technique.
Figure 1:
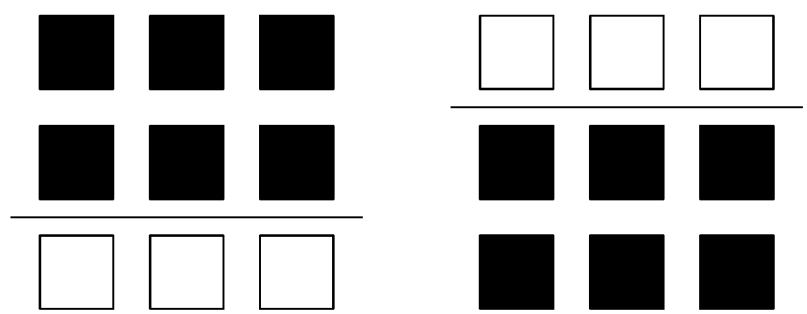
Figure 2A:
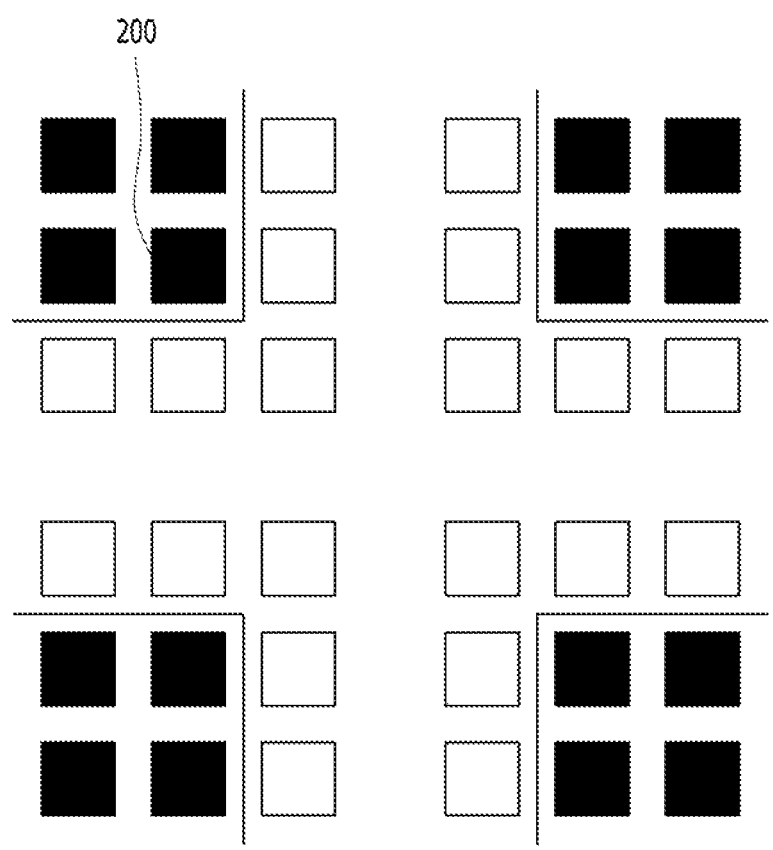
FIGS. 2A and 2B illustrate problems of the method for removing noise on an image in accordance with a conventional technique.
Figure 2B:
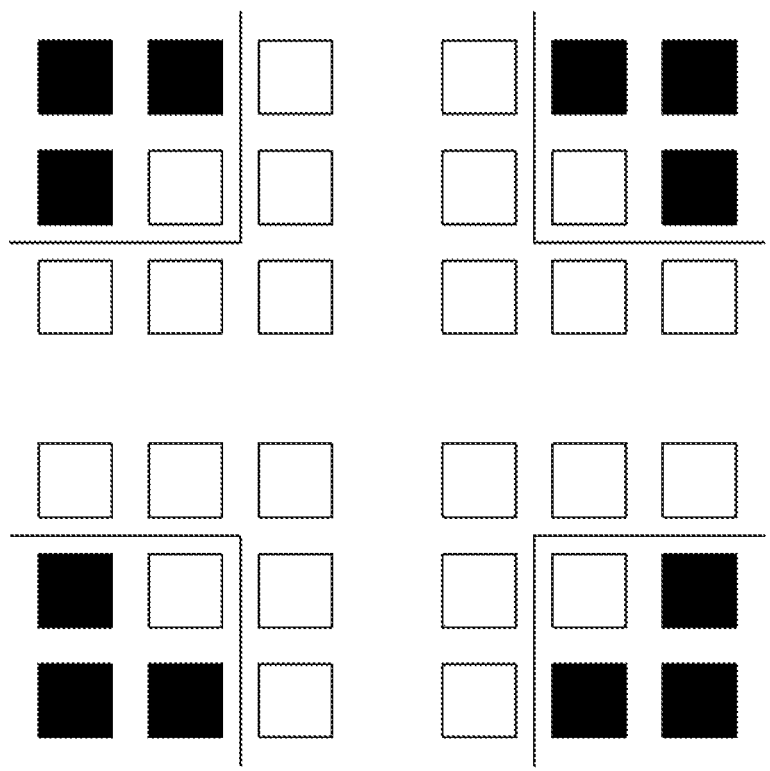
Figure 3A:
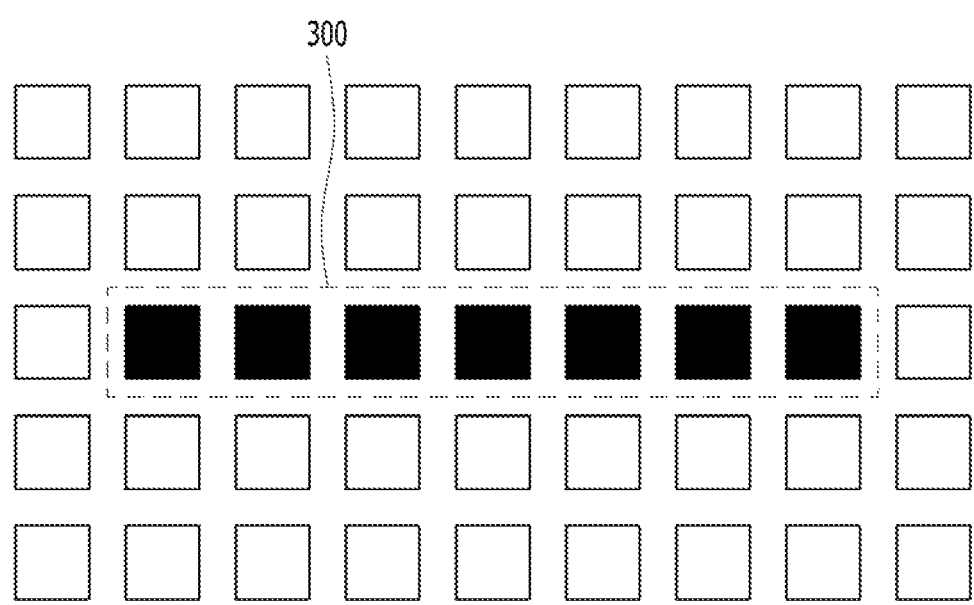
FIGS. 3A and 3B illustrate other problems of a method for removing a noise on an image in accordance with a conventional technique.
Figure 3B:
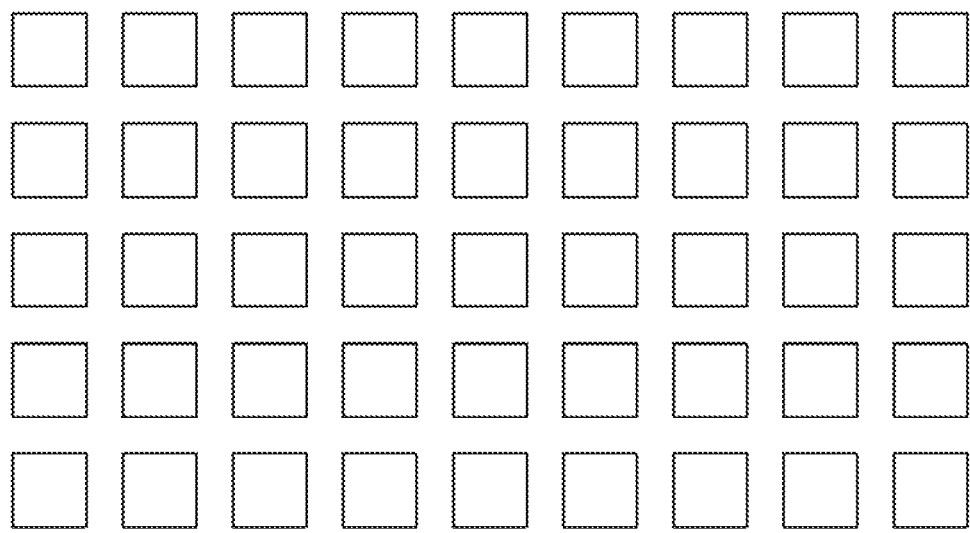

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, reference numerals correspond directly to the like parts in the various figures and embodiments of the present invention.

The drawings are not necessarily to scale and in some instances, proportions may have been exaggerated in order to clearly illustrate features of the embodiments. In this specification, specific terms have been used. The terms are used to describe the present invention, and are not used to qualify the sense or limit the scope of the present invention.

It is also noted that in this specification, 'and/or' represents that one or more of components arranged before and after 'and/or' is included. Furthermore, "connected/coupled" refers to one component not only directly coupling another component but also indirectly coupling another component through an intermediate component. In addition, a singular form may include a plural form as long as it is not specifically mentioned in a sentence. Furthermore, 'include/comprise' or 'including/comprising' used in the specification represents that one or more components, steps, operations, and elements exists or are added.

Figure 4A:
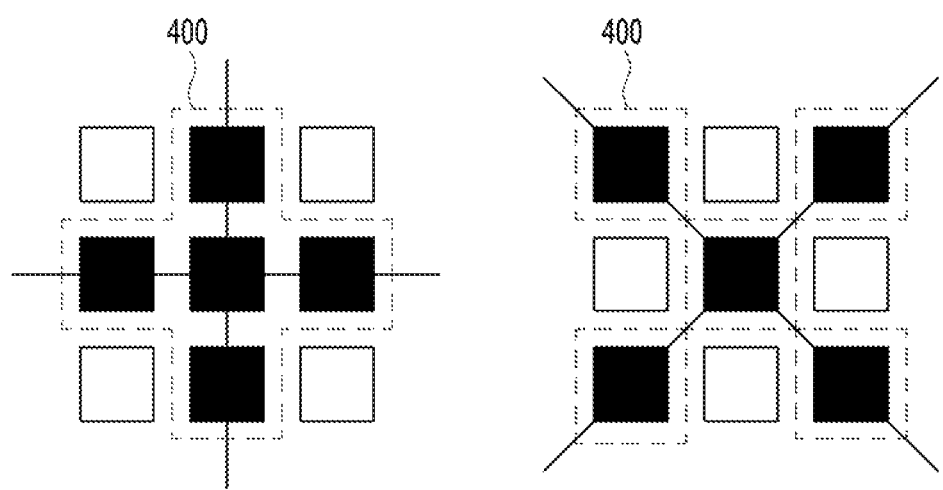
FIGS. 4A and 4B illustrate the definition of a cross-kernel used in a device for removing a noise on an image using a cross-kernel type median filter and a method therefor in accordance with an embodiment of the present invention.
Figure 4B:
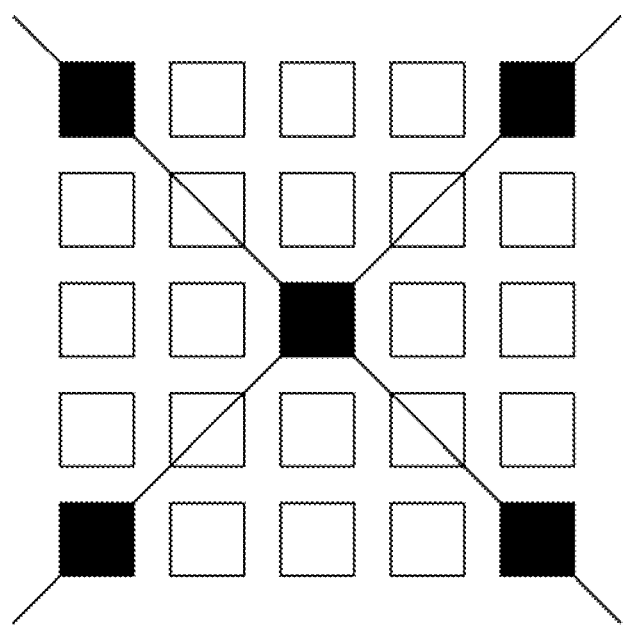
Figure 4B:
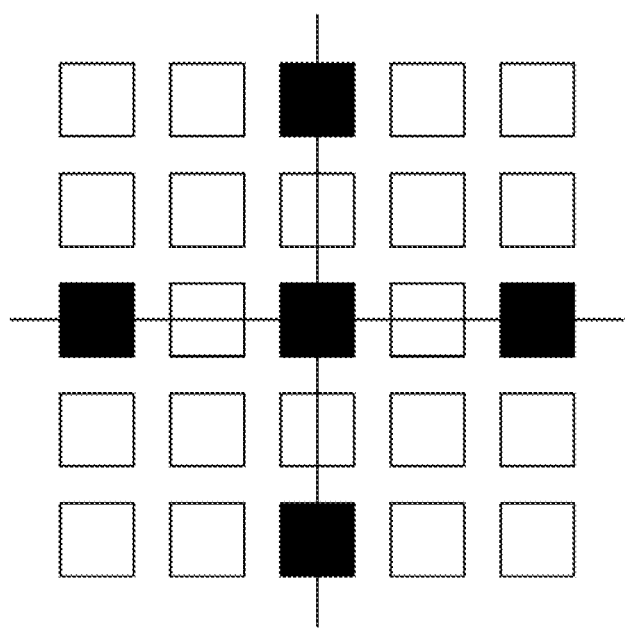

FIGS. 4A and 4B illustrate the definition of a cross-kernel used in a device for removing a noise on an image using a cross-kernel type median filter and a method therefor in accordance with an embodiment of the present invention.

When a center of 3×3 region of a target image on which a noise will be removed indicates a location of a target pixel on which the noise will be removed, the cross-kernel indicates a region 400 of pixels on two lines, which are across along '+' shape or 'X' shape on a basis of the target pixel.

FIG. 4A shows that each of the pixels included in the cross-kernel is neighboring from each other. FIG. 4B shows that each of the pixels included in the cross-kernel is spaced from at least one target pixel by a same interval.

Figure 5:
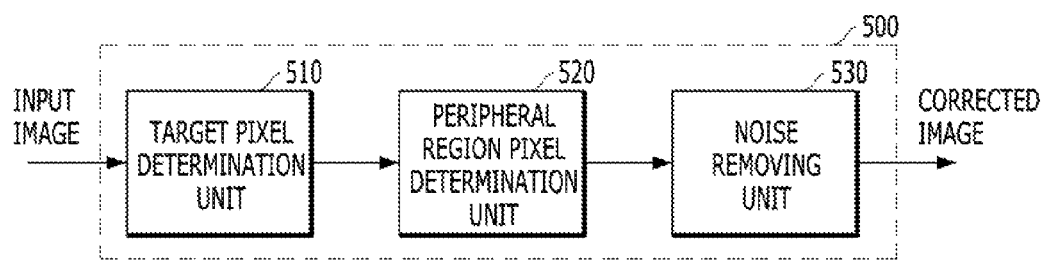
FIG. 5 is a block diagram illustrating a device for removing a noise on an image using a cross-kernel type median filter in accordance with an embodiment of the present invention.

FIG. 5 is a block diagram illustrating a device for removing a noise on an image using a cross-kernel type median filter in accordance with an embodiment of the present invention.

Referring to FIG. 5, a device 500 for removing a noise on an image using a cross-kernel type median filter in accordance with an embodiment of the present invention includes a target pixel determination unit 510, a peripheral region pixel determination unit 520 and a noise removing unit 530.

The target pixel determination unit 510 determines whether a target pixel on which a noise may be removed or not by calculating the complexity of a signal on a predetermined region on a basis of the target pixel and comparing a calculated result with a reference value (ref).

The peripheral region pixel determination unit 510 determines the degree of a noise in a brightness value on a peripheral pixel of the target pixel.

The noise removing unit 530 removes a noise of the target pixel and corrects an image by applying a cross-kernel type median filter of '+' shape or 'X' shape on a basis of the target pixel based on the information of the peripheral pixel, which is determined by the peripheral region pixel determination unit 520.

Operations of the target pixel determination unit 510, the peripheral region pixel determination unit 520 and the noise removing unit 530 will be described in later.

Figure 6:
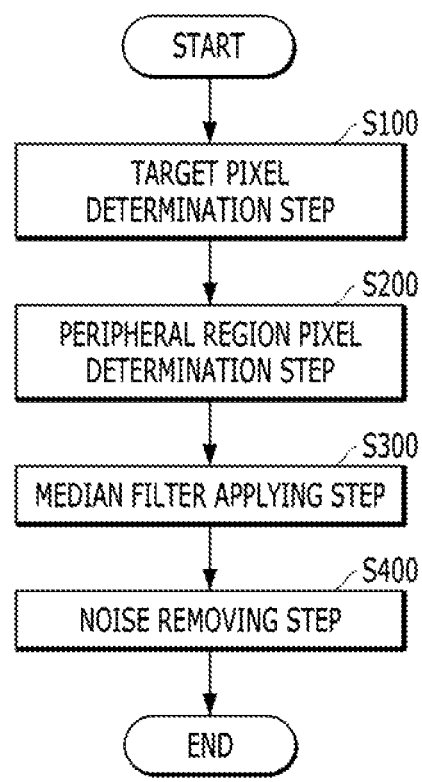
FIG. 6 is a flow chart illustrating a method for removing a noise on an image using a cross-kernel type median filter in accordance with an embodiment of the present invention.

FIG. 6 is a flow chart illustrating a method for removing a noise using a cross-kernel type median filter in accordance with an embodiment of the present invention.

Referring to FIG. 6, a method for removing a noise on an image using a cross-kernel type median filter in accordance with an embodiment of the present invention includes a target pixel determination step S100, a peripheral region pixel determination step S200, a median filter applying step S300 and a noise removing step S400.

In the target pixel determination step S100, it is determined whether the target pixel is a noise or not. That is, it is determined whether the noise on the target region will be removed or not by calculating the complexity (that is, variance) of the signal on the predetermined region on a basis of the target pixel, and comparing the calculated result with the predetermined reference value.

In the peripheral region pixel determination step S200, the degree of the noise in the brightness value on the peripheral pixel of the target pixel is determined.

In the median filter applying step S300, a cross-kernel type median filter of '+' shape or 'X' shape is applied to an image on a basis of the target pixel based on the information of the peripheral pixel.

In the noise removing step S400, the image is corrected by removing the noise on the target pixel using the cross-kernel type median filter. Herein, the target pixel indicates the pixel which is disposed on a center of 3×3 region and on which the noise will be removed.

Figure 7A:
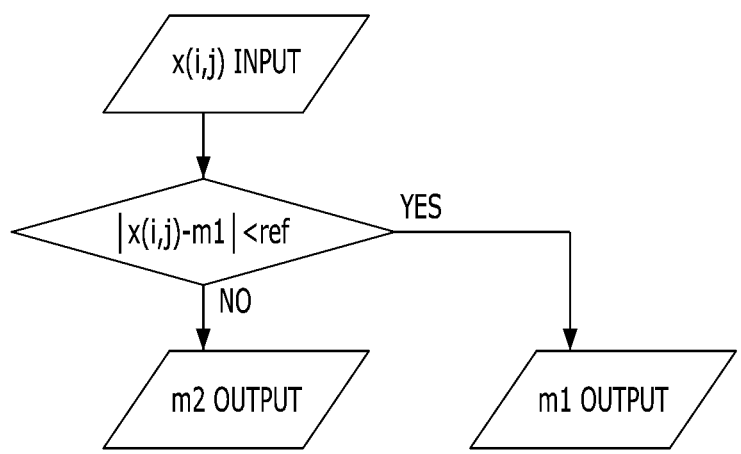
FIGS. 7A and 7B are flow charts illustrating processes for removing a noise on an image using a cross-kernel type median filter.
Figure 7B:
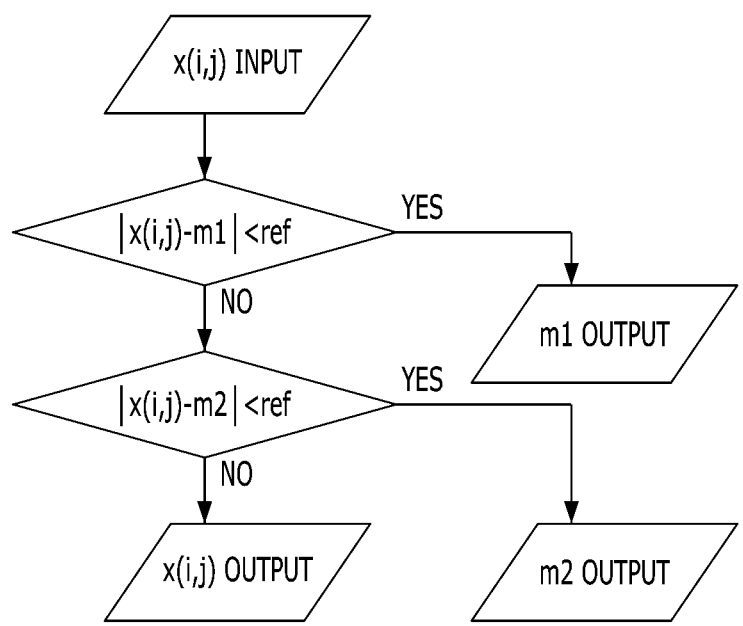

FIGS. 7A and 7B are flow charts illustrating processes for removing a noise using a cross-kernel type median filter.

Referring to FIG. 7A, if a median of 3×3 region is denoted as a first median m1, and a median of the cross-kernel is denoted as a second median m2, when an absolute value of a difference value between a first median m1 and a data value x(i,j) of a target pixel, which is disposed at a horizontal direction i and a vertical direction j, is less than the reference value ref, the first median m1 is determined and outputted as the value of the data where the noise is removed, and otherwise, the second median m2 is determined and outputted as the value of data where the noise is removed.

Meanwhile, referring to FIG. 7B, if the median of 3×3 region is denoted as the first median m1, and the median of the cross-kernel is denoted as the second median m2, when the absolute value of the difference value between the first median m1 and the data value x(i,j) of the target pixel is less than the reference value ref, the first median m1 is determined and outputted as the value of the data where the noise is removed. When the absolute value of the difference value between the first median m1 and the data value x(i,j) of the target pixel is larger than the reference value ref, and the absolute value of the difference value between the second median m2 and the data value x(i,j) of the target pixel is less than the reference value ref, the second median m2 is determined and outputted as the value of data where the noise is removed. Otherwise, the data value x(i,j) of the target pixel is determined and outputted as the value of the data where the noise is removed.

In case of FIGS. 7A and 7B, the second median m2 as the median in the cross-kernel is used in the cross-kernel type median filter of the '+' shape and may be used in the cross-kernel type median filter of the 'X' shape.

Moreover, in another embodiment of the present invention, the value of the data where the noise is removed may be outputted by comparing the absolute value of the difference value between a maximum value max of 3×3 region and a minimum value min of 3×3 region with the reference value ref.

It is preferable that a square root of the data value (x) of the target pixel or a square root of an average value on 3×3 region is used as the reference value ref. Meanwhile, it is more preferable that the reference value ref is acquired by multiplying a reference constant by the square root of the data value (x) of the target pixel or the square root of the average value.

The reason that the square root of the data value (x) of the target pixel or the square root of the average value in 3×3 region is used as the reference value ref will be described as below.

The number of photons, which inputted to a photo receiver of an image sensor, is determined along the Poisson distribution. If the number of photons is great or the exposure time is long, the number of photons inputted to the photo receiver is increased linearly. If the number of photons or the exposure time is adjusted such that the number of photons become λ, a probability distribution of the number X of photons, which are inputted to the photo receiver, is determined along the Poisson distribution having a variance $\sigma^2=\lambda$ and an average value $\mu=\lambda$.

The brightness value Y of the image is proportional to the number of photons. If a variable number which indicates the number of photons is X, the brightness value Y is determined along the Poisson distribution. If the number X of the photons is determined along the Poisson distribution having the average value λ and a standard deviation λ, the brightness value Y is determined along the Poisson distribution having the average value Cλ and the variance $C^2\lambda$. Herein, a proportional constant C indicates a parameter, which represents the characteristics of the image sensor.

As described above, the noise occurs according to the change of the number of photons under a sufficient illuminance, and this is denoted as a shot noise. The shot noise is proportional to the square root of the brightness value of the image. Thus, it is preferable that the square root is used as the means for determining the degrees of the noise.

FIGS. 8A to 8D illustrate the efficiency of a method for removing a noise on an image using a cross-kernel type median filter.

Figure 8A:
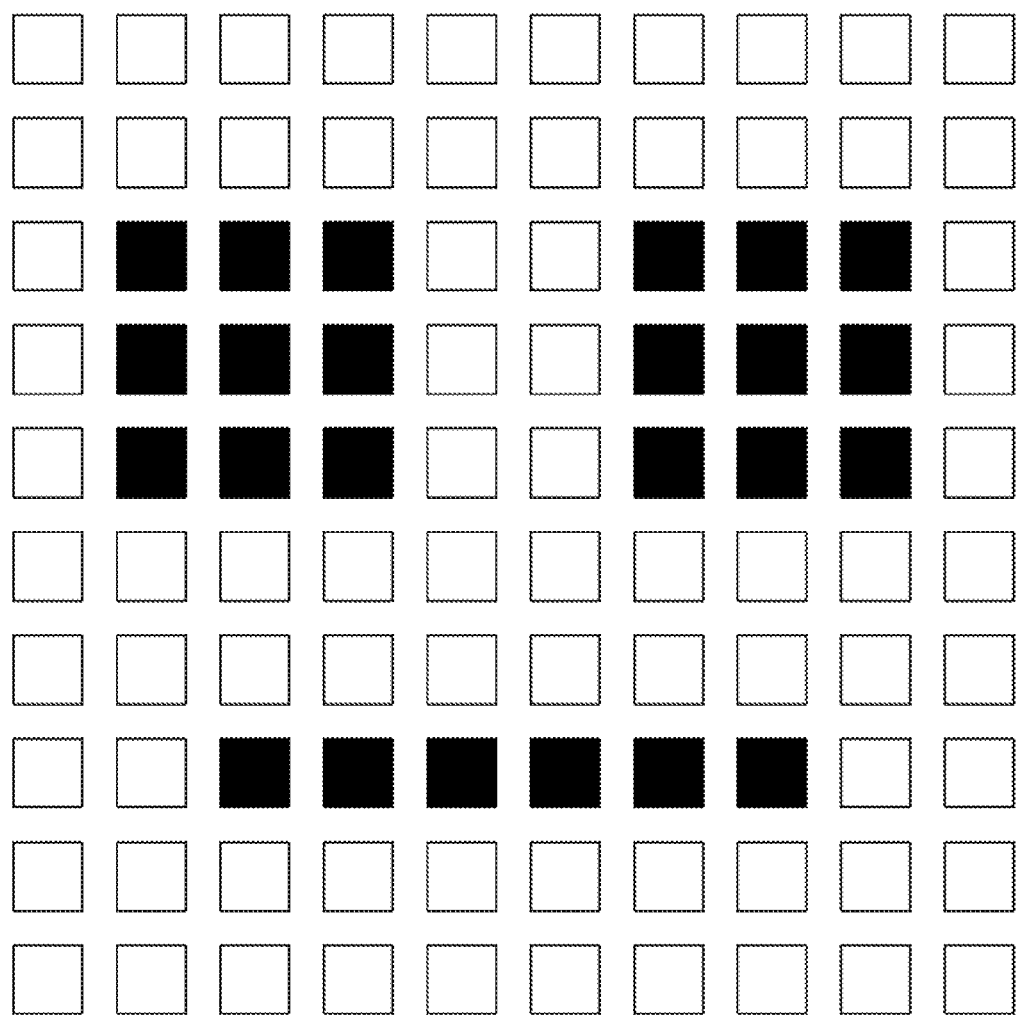
FIGS. 8A to 8D illustrate the efficiency of a method for removing a noise on an image using a cross-kernel type median filter.
Figure 8B:
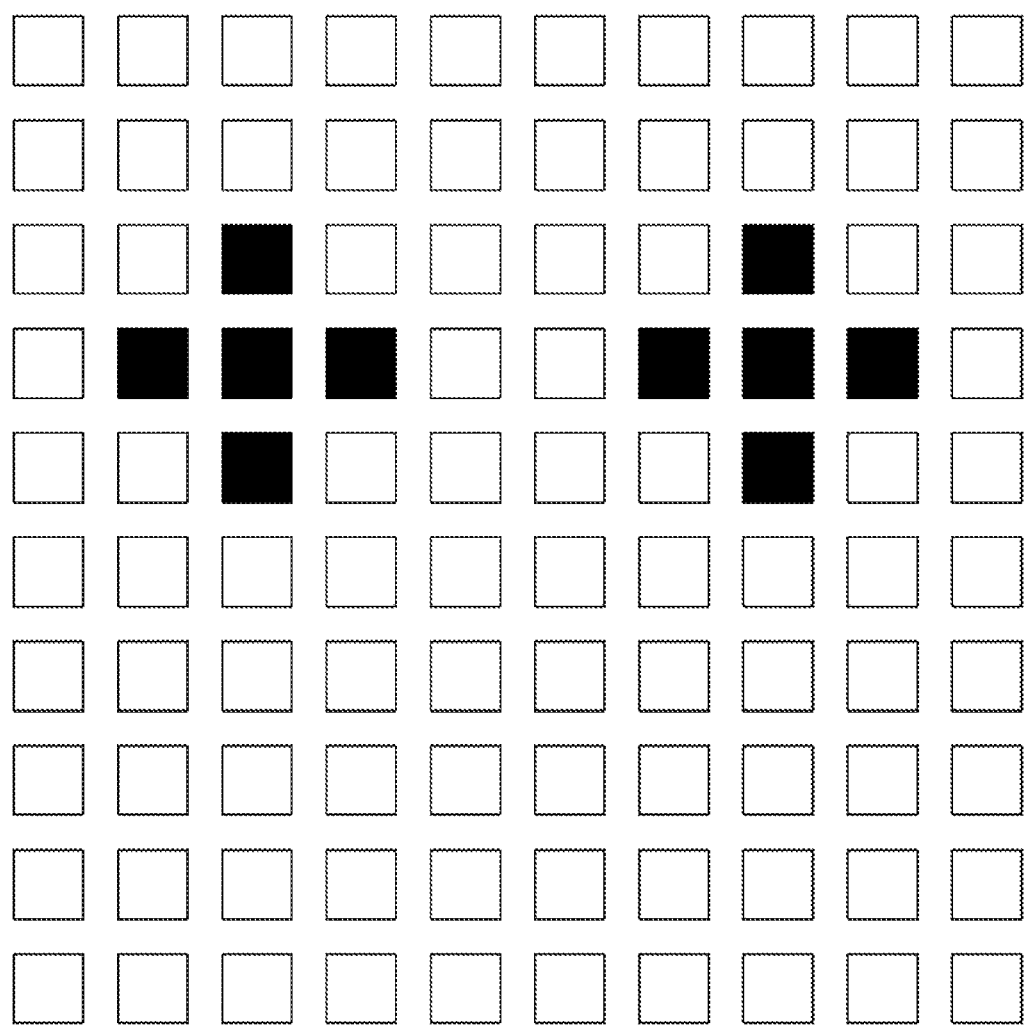

In case that the median filter of 3×3 region is applied to the original image shown in FIG. 8A, an image block corner of 3×3 region and a thin line is removed as shown in FIG. 8B.

Figure 8C:
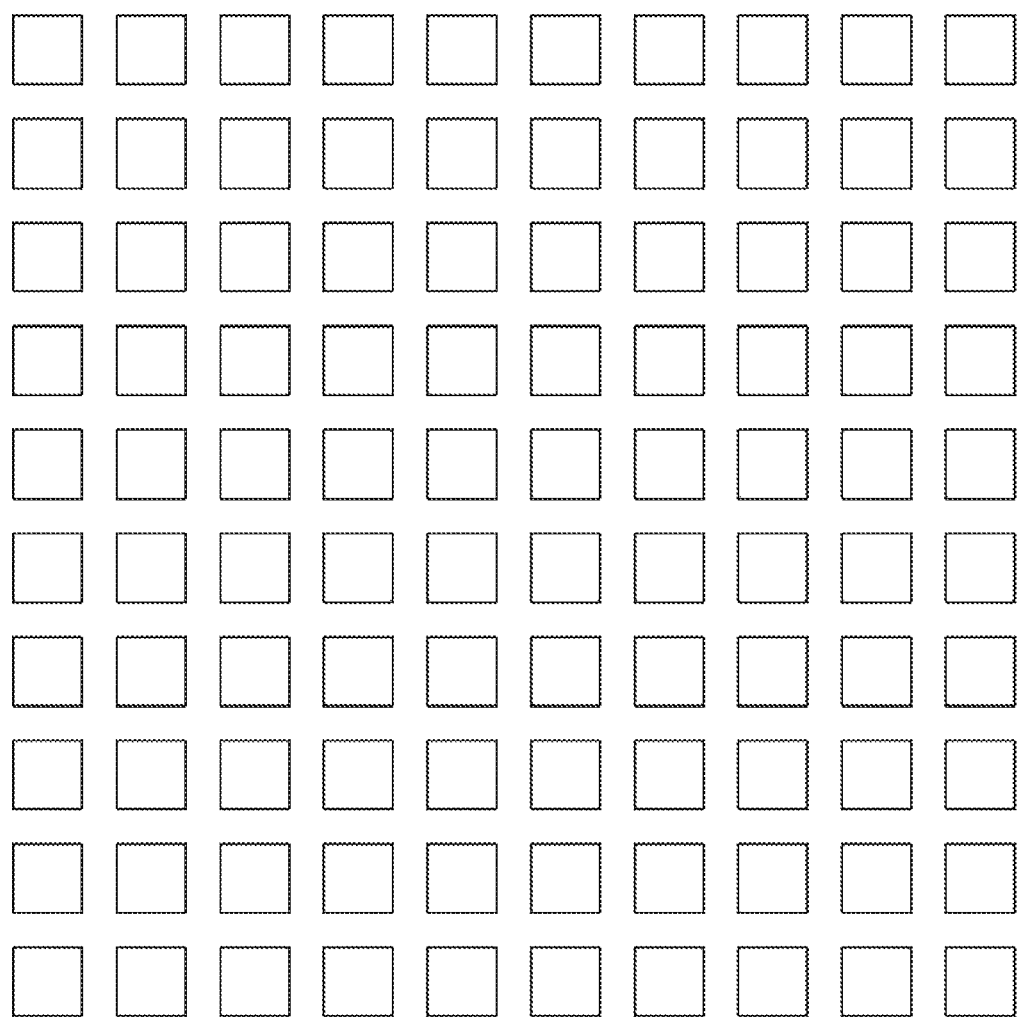

Moreover, in case that the median filter of 5×5 region is applied to the original image, the image block of 3×3 region and the thin line is removed as shown in FIG. 8C.

Figure 8D:
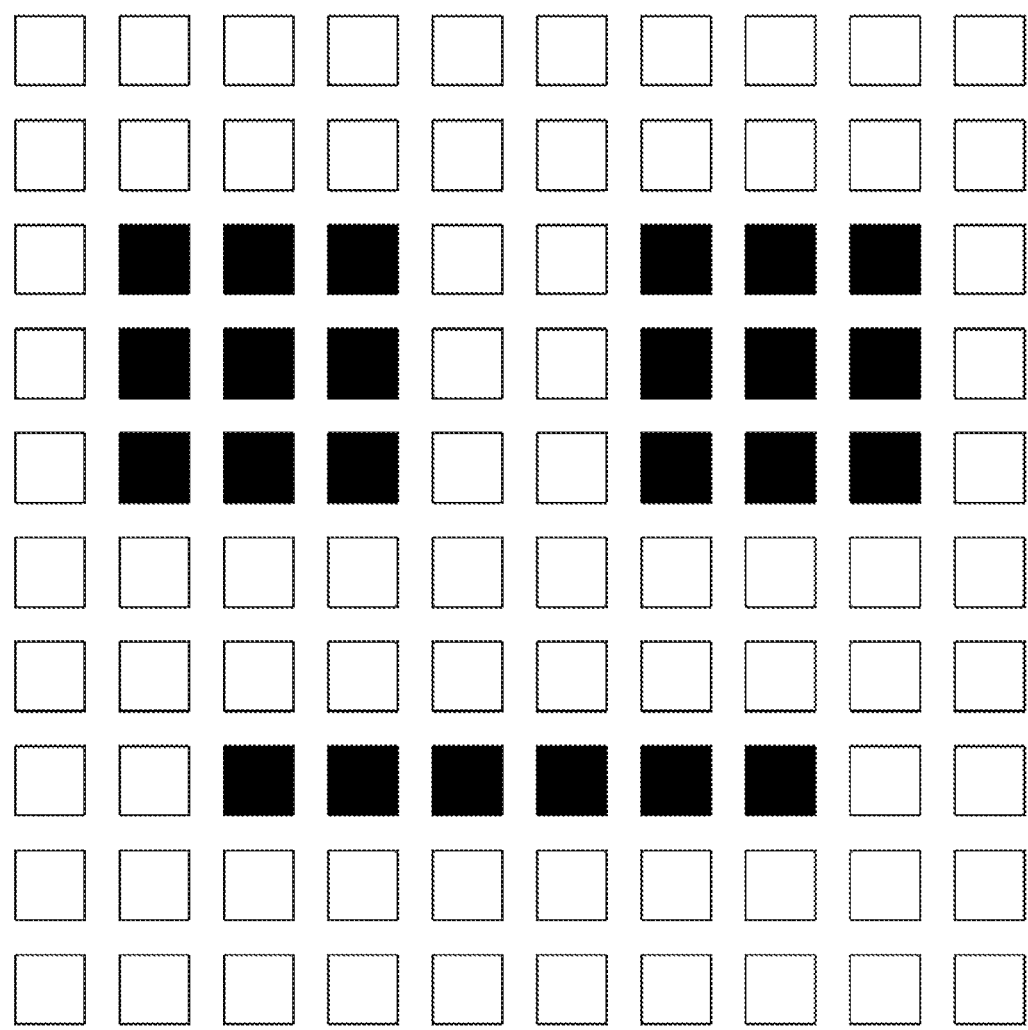

Meanwhile, in case that the cross-kernel type median filter is applied to the original image in accordance with an embodiment of the present invention, the image block of the thin line and the image block of 3×3 region as shown in FIG. 8D.

A table 1 indicates a peak signal to noise ratio in case of an average filter, a median filter and a cross-kernel type median filter in accordance with the embodiment of the present invention. Referring to the table 1, the cross-kernel type median filter in accordance with the embodiment of the present invention has a higher quality than the median filter by 1.88 dB, and has a higher quality than the average filter by 2.67 dB.

TABLE 1

| Median filter | Average filter | Cross-kernel type median filter in accordance with the present invention |
|---|---|---|
| 27.0503 [db] | 27.863 [db] | 29.7233 [db] |

The device for removing the noise on the image using the cross-kernel type median filter and the method therefor in accordance with the embodiments of the present invention may remove efficiently the noise of the image without the loss of the outline of the image. The device for removing the noise on an image using the cross-kernel type median filter and the method therefor in accordance with the embodiments of the present invention may acquire the signal to noise ratio higher than the median filter using a conventional technique.

While the present invention has been described with respect to the specific embodiments, it will be apparent to those skilled in the art that various changes and modifications may be made without departing from the spirit and scope of the invention as defined in the following claims.

What is claimed is:

1. A method for removing a noise on an image using a cross-kernel type median filter, comprising the steps of:
   determining whether a target pixel is a noise or not;
   determining information on a peripheral pixel of the target pixel;
   applying the cross-kernel type median filter based on the determined information of the peripheral pixel; and
   correcting the image by removing the noise using the cross-kernel type median filter,
   wherein the target pixel is disposed on a center of 3×3 region of the image,
   wherein a median of 3×3 region is denoted as a first median, and a median of a region using the cross-kernel type median filter is denoted as a second median, and
   wherein when an absolute value of a difference value between the first median and a data value of the target pixel is less than a reference value, the first median is outputted as the value of the data where the noise is removed, otherwise, the second median is outputted as the value of data where the noise is removed.

2. The method for removing the noise on the image using the cross-kernel type median filter of claim 1, wherein the cross-type median filter selects a median from pixels, which are disposed on two lines when the two lines are across on a basis of the target pixel, which are disposed on a center of 3×3 region of the image.

3. The method for removing the noise on the image using the cross-kernel type median filter of claim 1, wherein the two lines include '+' shape or 'X' shape.

4. The method for removing the noise on the image using the cross-kernel type median filter of claim 1,
   wherein when an absolute value of a difference value between a maximum value of 3×3 region and a minimum value of the 3×3 region is less than a reference value, the first median is outputted as the value of the data where the noise is removed, and otherwise, the second median is outputted as the value of data where the noise is removed.

5. The method for removing the noise on the image using the cross-kernel type median filter of claim 1,
   wherein when the absolute value of the difference value between the first median and the data value of the target pixel is larger than the reference value, and the absolute value of the difference value between the second median and the data value of the target pixel is less than the reference value, the second median is outputted as the value of data where the noise is removed, and otherwise the data value of the target pixel is outputted as the value of the data where the noise is removed.

6. The method for removing the noise on the image using the cross-kernel type median filter of claim 1,
   wherein when an absolute value of a difference value between a maximum value of the 3×3 region and a minimum value of the 3×3 region is less than a reference value, the first median is outputted as the value of the data where the noise is removed, and
   wherein when the absolute value of the difference value between the maximum value of the 3×3 region and a minimum value of the 3×3 region is larger than the reference value, and the absolute value of the difference value between the data value of the target pixel and the second median is less than the reference value, the second median is outputted as the value of the data where the noise is removed, and otherwise the data value of the target pixel is outputted as the value of the data where the noise is removed.

7. The method for removing the noise on the image using the cross-kernel type median filter of claim 1, wherein the reference value is a square root of the data value of the target pixel.

8. The method for removing the noise on the image using the cross-kernel type median filter of claim 7, wherein the reference value is a value acquired by multiplying the square root of the data value of the target pixel by a standard constant.

9. The method for removing the noise on the image using the cross-kernel type median filter of claim 1, wherein the reference value is a square root of an average value of the 3×3 region.

10. The method for removing the noise on the image using the cross-kernel type median filter of claim 9, wherein the reference value is a value acquired by multiplying the square root of the average value of the 3×3 region by a standard constant.

* * * * *